Alec S. ELLETT, Inventor
by Lyle G. Thorey, Agent

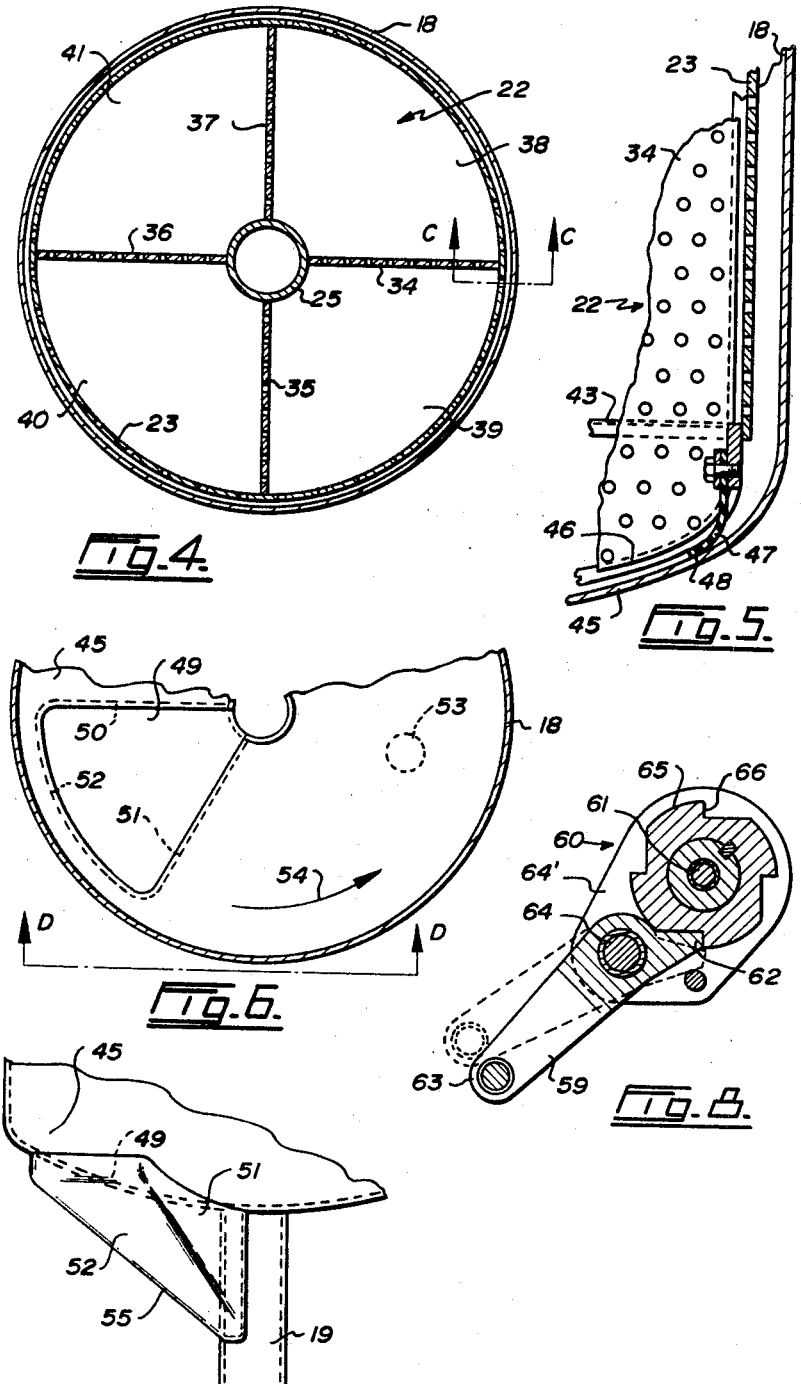

United States Patent Office 3,399,999
Patented Sept. 3, 1968

3,399,999
PROCESS AND APPARATUS FOR CONTINUOUS DE-AERATING OF FRUIT AND VEGETABLES
Alec S. Ellett, Vancouver, British Columbia, Canada, assignor to Ellett Copper & Brass Co. Limited, a corporation of British Columbia
Filed Dec. 27, 1966, Ser. No. 605,055
9 Claims. (Cl. 99—154)

The invention relates to a process and apparatus for continuous de-aerating of fruit and vegetable products.

While such apparatus can be, and is, used in processing different fruits and vegetables, it is particularly adapted to de-aerating sliced apples. The description hereinafter is primarily concerned with the processing of sliced apples, but it is to be understood that the method and apparatus are not thereto confined.

As is well known in the art, de-aerating properly accomplished results, for instance, in that an apple pie made with canned de-aerated sliced apples shall, after cooking, contain separate apple slices rather than a nearly homogenous mass resembling an apple sauce. The advantages to the art are well known, and prior art apparatus is capable of effecting satisfactory de-aeration.

In a common form of such apparatus, sliced apples are introduced into a vessel which is then evacuated. When the slices have been subjected to the low pressure within the vessel for a sufficient length of time, the seal is broken and the de-aerated slices are removed. Difficulties are encountered in breaking the vacuum, some of which difficulties are associated with time. Success has been attained in apparatus wherein the vacuum is broken by introducing steam into the vessel and, while this has certain advantages, that method suffers from additional attendant difficulties well known in the art.

The present invention discloses a continuous process of discharging apple slices conveyed in an admixture with water, and introduced into a vessel continuously maintained at sub-atmospheric pressure, to be received in a perforated segment of a basket mounted for rotation within the vessel. When a segment has been sufficiently charged with apple slices it is given an incremental rotation such that an adjacent segment is in a charging position. This incremental motion is repeated until the first filled segment, all of the segments having open ends, is in register with an opening of the bottom of the vessel to discharge through a product-out chute to a discharge pipe.

A central concept of the invention is that the discharge pipe is filled with water as well as with discharged apple slices, thus problems associated with the breaking of the vacuum do not arise since the vacuum is not broken, but is continuous.

Figure 1:
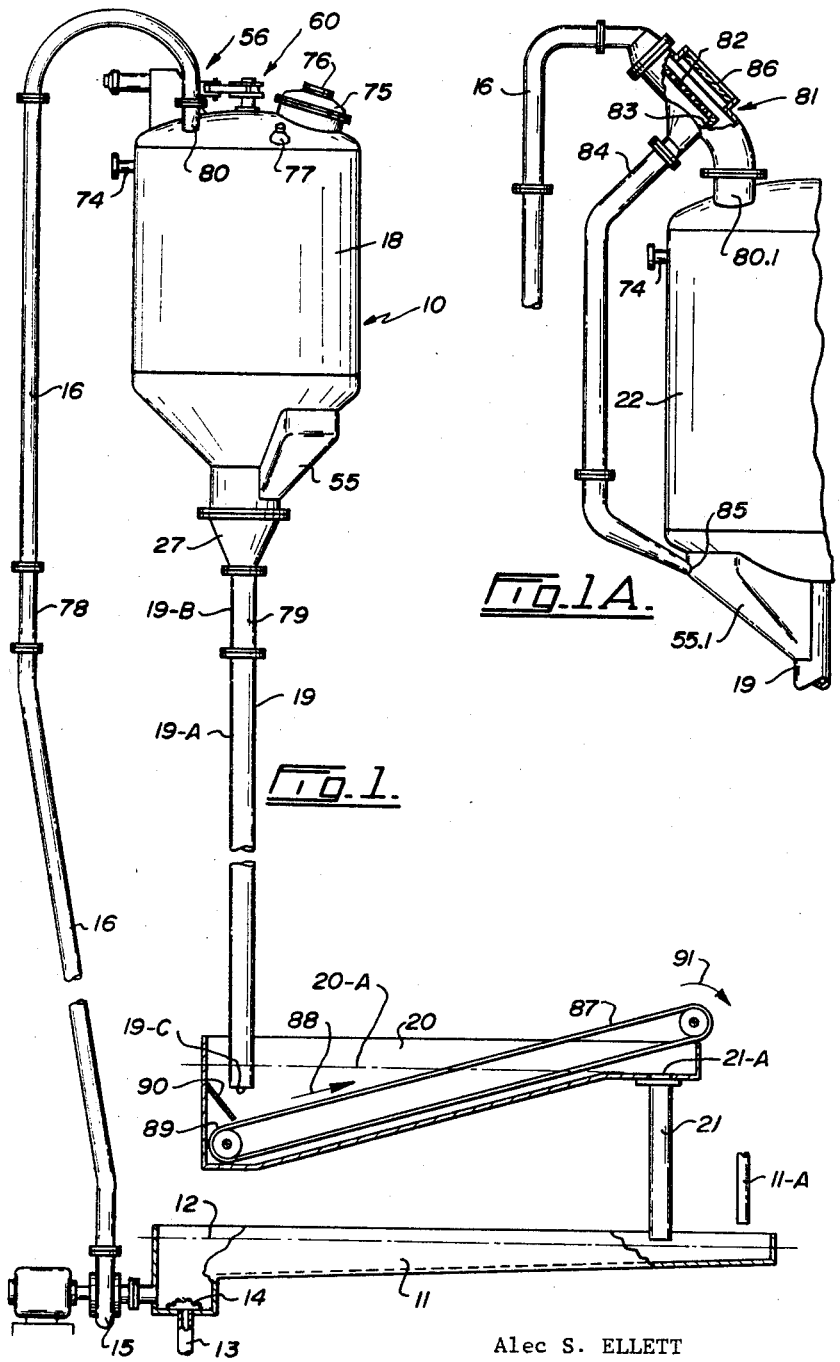
Figure 2:
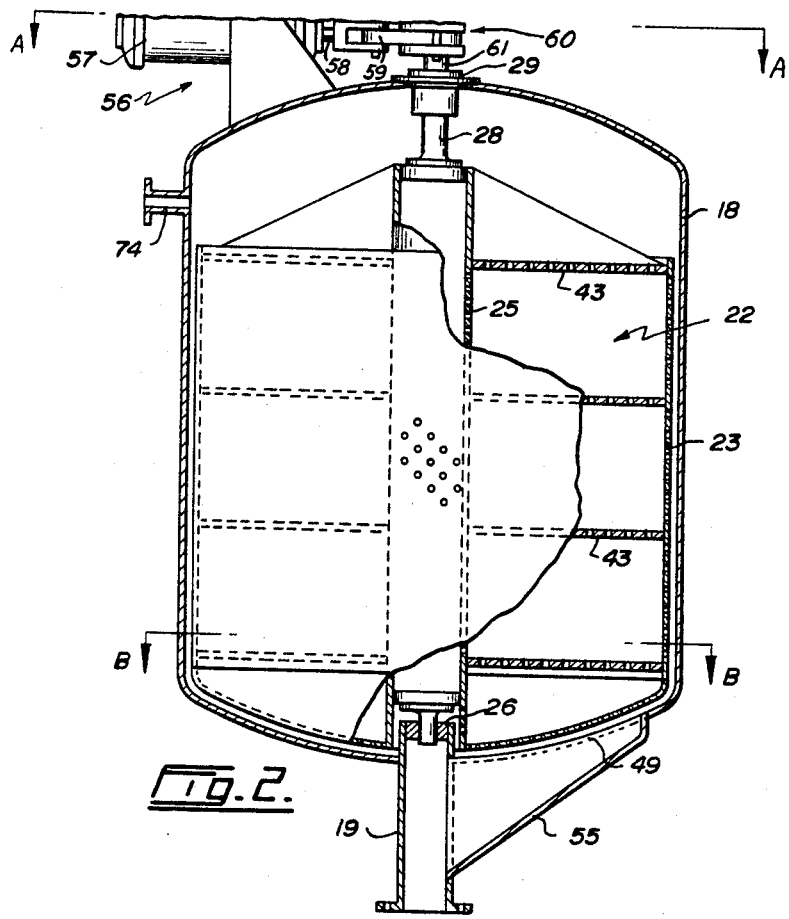
Figure 3:
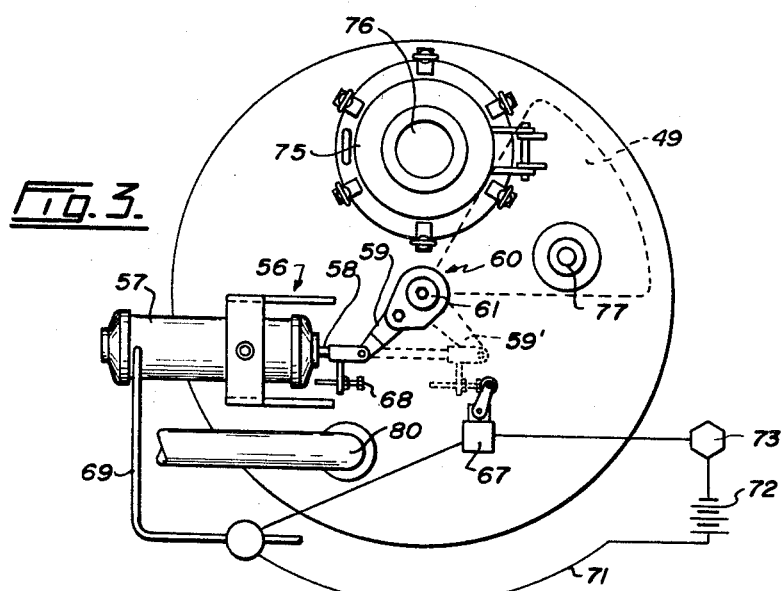

Further description of the method is given below, together with examples of apparatus in which the inventive concept herein is embodied. In the description reference is made to the drawings in which:

FIGURE 1 shows schematically the general layout of the subject apparatus and ancillaries, FIGURE 1-A is a fragmented detail illustrating an alternative feed arrangement, FIGURE 2 is a part sectional elevation of a chamber assembly, FIGURE 3 is a plan as seen from A—A of FIGURE 2, FIGURE 4 is a section on B—B of FIGURE 2, FIGURE 5 is a fragmented partial section on C—C of FIGURE 4, FIGURE 6 is a fragmented part plan of a bottom of the chamber of FIGURE 1, FIGURE 7 is a partial elevation of the bottom of the chamber of FIGURE 1 as seen from D—D of FIGURE 6, FIGURE 8 is a detail part sectioned plan showing a ratchet and pawl part of a basket incremental rotating means.

In FIGURE 1, an example of apparatus according to the invention is indicated generally by the numeral 10, the apparatus being adapted, for example to processing sliced apples. Apples from a slicer, not shown, are discharged to a feed sluice 11 containing water maintained at a level 12. A drain 13 at a water outlet end of the sluice is protected by a screen 14. Water, now containing apple slices, is driven by an open impeller pump 15 up a feed line 16 to discharge into a compartment of a revolving inner member of a de-aeration vessel 18, maintained at sub-atmospheric pressure by known means not shown. The inner member is a hollow perforated open cylinder divided into a number of segments, suitably four as later described, segment partition walls also being performated so that water may drain through discharge line 19 to a conveyor tank 20. In operation, the discharge line is full, or nearly full, of water and slices up to an upper end 19-A of a barometric leg 19-B of the discharge pipe, which leg extends some 34 feet above the water level, 20-A, of the conveyor tank 20.

It is to be noted that water from the conveyor tank 20 discharges to the feed sluice 11 through a down pipe 21. Obvious means not shown are provided to maintain the water level of the sluice 11 within required limits.

In FIGURES 2 and 4, the inner member is designated generally by the numeral 22, being mounted for rotation within the vessel 18. The inner member, hereinafter to be referred to as the "basket," is (as before stated), generally of hollow open ended cylindrical shape, having a perforated side wall 23. Integral with, and central of, the basket is a hollow perforated vertical shaft 25 supported by a suitable bottom bearing 26 of a reducer 27 (FIGURE 1) at an upper end of the discharge line 19. An upper end of the perforated shaft 25 has a shafted pedestal 28 a shaft of which extends outwards of the vessel 18 through a gland 29.

Thus the basket, which has an outside diameter less than the inside diameter of the vessel 18 as best seen in FIGURE 5, is rotatable thereof—the bottom bearing 26 being watertight, and the gland 29 being sufficiently airtight to prevent material loss of vacuum.

Referring to FIGURE 4 and FIGURE 5, perforated radial partition walls, 34, 35, 36, 37 extend between the central shaft 25 to the basket sidewall dividing the basket into four equal segments 38, 39, 40, 41. Obvious radial framing members 43 are provided to strengthen the basket—suitably these too are perforated to facilitate washing out.

As best seen in FIGURE 5 the basket cylindrical sidewall 23 extends nearly to a concave bottom wall 45 of the vessel. It is seen that a bottom edge 46 of the partition wall 34 is formed to have a shape complementary to the said bottom wall, small clearance suitably about an eighth of an inch being provided. The partitions 35, 36, 37 are similarly shaped.

An inert flexible apron 47 of composition or rubber extends completely around the basket wall 23 being secured to an inner surface thereof. A lower portion 48 of the apron extends to and is in contact with the bottom wall 45 of the vessel.

As seen in FIGURE 6, the bottom wall 45 has an opening 49 defined by substantially radial side edges 50, 51, an arcuate end wall 52, and the central shaft 25—the end wall subtending 60°. It is to be noted that a broken outline circle 53 indicates position and orientation of a product-in nozzle which is later referred to, the centre of the circle being disposed about 15° clockwise of the radial edge 51 produced, as shown, rotation of the basket being counterclockwise as indicated by the arrow 54.

Clockwise and counterclockwise are here so designated as viewed in FIGURE 6.

Referring now to FIGURE 7, a product-out chute 55 communicates with an upper end of the discharge pipe 19 as shown, the discharge chute being secured to the bottom wall 45 of the vessel so that the opening 59 provides a discharge passage through the chute 55 to the discharge line 19.

Actuated by mechanism later described, rotation of the basket proceeds in 90° increments (in the case of a four segment basket) with a predetermined time delay between each incremental rotation. The bottom of each basket segment is open, and the base of the vessel contains the opening 49 communicating with the product-out chute 55 as has been explained. A basket segment being in a loading position to receive apple slice containing water discharged from the feed line 16, the water commences to drain out through the discharge line 19. When the segment is sufficiently loaded, the basket rotates through 90° placing an empty segment in the loading position—for loading as before. When a third 90° increment is completed the basket segment, the loading of which was first described above, is in register with the bottom opening 49 and thus discharges its contents, now de-aerated sliced apple, through the discharge line 19 to the conveyor tank 20 thence to a blancher not shown. It is seen that the fourth 90° increment completes a revolution of the basket when the first segment, now unloaded and empty, is again in the loading position and will be filled. The cycle repeats as described. It is also seen that each basket segment is in the loading position for one time interval, in a mainly de-aerating position for two intervals, and the discharge position for one interval. De-aeration takes place not only in the "mainly de-aerating" position above, but is continuous from entry until the de-aerated slices enter the water at the upper end, 19–B, of the barometric leg. Drainage occurs substantially entirely in the first three positions.

Rotation of the device is in discrete intervals of 90°, the basket being stationary for a particular period of time upon completion of each incremental motion. Provision is made for increasing or decreasing the period. Incremental rotation is effected by mechanism generally indicated by the numeral 56 in FIGURES 1, 2, and 3. Referring particularly to FIGURE 3, the mechanism has a fluid actuated double-acting cylinder 57, having a piston rod 58 an outer end thereof being secured to an arm 59 of a pawl and ratchet mechanism generally indicated by the numeral 60. The piston rod 58 is extensible from the full line position shown to a broken line position so that the arm 59 is rotated through 90° to a broken line position 59', as shown. Motion of the arm as described causes a shaft 61 of the shafted pedestal 28 to rotate through 90°, thus rotating the basket 22 through 90°. Upon having reached the broken line position 59' the piston rod 58 is caused to retract to the full line position, where it remains for a period of time (as previously mentioned), at the expiration of which the piston rod again moves outward accomplishing a second 90° rotation.

Referring now to FIGURE 8, the arm 59 has an end thereof shaped to form a pawl as indicated by the numeral 62, the pawl being at an end of the arm remote from an end 63 to which the piston rod 58 (not shown in FIGURE 8) is rotatably secured. The arm 59 is journalled on a shaft 64 secured to an element 64' of the ratchet mechanism. The numeral 65 designates a four-lobed ratchet, each lobe having a radial face 66, the faces 66 being spaced 90°. The ratchet 65 is secured to the shaft 61 aforesaid, and it is seen that motion of the piston rod 58 as described will rotate the ratchet, and hence the basket, through 90° increments.

In FIGURE 3, the numeral 67 indicates a limit switch operated by an actuator 68, secured to the piston rod 58, when the arm 59 reaches the broken line position 59' a fluid line 69 supplies fluid under pressure from a source, not shown, to operate the cylinder 57. At a convenient position in the line a solenoid valve of a known kind is provided. An electrical circuit indicated by the numeral 71 connects a terminal of the solenoid valve to a suitable power source 72, a second terminal of the solenoid valve being connected to one terminal of the limit switch, the other terminal of which leads to a timer 73, thence to the power source 72 aforesaid. It is to be understood that the electrical arrangements interconnecting the limit switch, the timer, the power source, and the solenoid valve, are diagrammatic only. Details of an arrangement to effect rotation as above described, a timed stationary interval, and further rotation are well-known, in the art and thus are not described in detail.

Having reference to FIGURE 1, a vacuum inlet port 74 is provided which port, as best seen in FIGURE 2, communicates with the interior of the vessel 18 above the basket. Referring again to FIGURE 1, a standard manway 75 is provided in the top wall of the vessel 18, the man-way having a sight glass 76. A light fixture 77 is also provided so that the interior of the vessel may be illuminated. A length of Pyrex glass, 78 and 79, is provided at a convenient position in each of, the feed line 16, and the discharge line 19, for inspection purposes. The feed line 16 communicates with the interior of the vessel through a product-in port 80 as best seen in FIGURE 1.

FIGURE 1–A shows an alternative feed arrangement, including a de-watering device indicated generally by the numeral 81. A lower end of the de-watering device is secured to a product-in-port 80.1 which differs from the product-in-port 80 above in that, for convenience of attachment to the de-watering device, it is somewhat larger. The de-watering device has a longitudinal grating 82 extending within the device to a dam baffle 83, the baffle being constructed and arranged to divert water to a waste by-pass 84 extending to a port 85 adjacent the bottom of the chamber 22, the port communicating with a product-out chute here designated 55.1. The port 85 is an opening at an upper end of the chute adjacent to the vessel 22. The product-out chute 55.1 differs from the product-out chute 55, FIGURE 1, only in the attachment of the waste by-pass 84 thereto as indicated at 85. A sight glass 86 is provided in an upper side wall of the de-watering device being generally disposed parallel to the grating 82. The grating 82 is constructed and arranged so that passage through the de-watering device is provided having a cross-section area desirably somewhat greater than the cross-section area of the feed line 16. Apple slices will not pass through the grating and will, thus, be free to pass unimpeded through the product-in-port 80.1. The dam baffle 83 is constructed and arranged effectively to form an upwards extension of an inner wall of the waste by-pass 84, so that water in the feed pipe 16 shall, to a material extent, pass through the grating to the said waste by-pass pipe, thence to enter the product-out chute 55.1. In the FIGURE 1–A alternative it is seen that much less water will pass through the product-in-port 80.1 than will pass through the product-in-port 80 of FIGURE 1, additionally discharge of water from the waste by-pass 84 to the product-out chute 55.1 will aid in flushing the product-out chute 55.1, thus aiding unloading.

Referring now to FIGURE 1, the conveyor tank 20 has a conveyor 87 an upper part of which is driven by common means, not shown, to travel in a direction as indicated by an arrow 88, a lower end 89 is disposed adjacent a bottom of the tank, sloping baffle 90 being provided so that apple slices in the water discharged from the discharge line 19 shall reach the said upper portion of the conveyor thus to be carried upwards to be discharged in a general direction as indicated by the arrow 91, for subsequent blanching by known means.

The operation of the apparatus is now described as follows, most of the operations having either been described above or being implicit.

Referring to FIGURE 1, apple slices from a slicer, not shown, are fed by known means to the feed tank 11 and thus enter the open impeller pump 15 to the pumped upward of the pipe 16 to discharge into the basket 22. At the commencement of the operation now being described, a basket segment, for instance the segment 49 (FIGURE 4) is in a position to receive the apple slices, together with some water, passing through the product-in-port 80, or 80.1 as the case may be. At the commencement of the operation the electrical circuit 71, FIGURE 3, is energized, and the timer 73 is operating. Taking into consideration factors including, the volume of a basket segment and the capacity of the pump, a particular time will be required during which the product is permitted to enter this particular compartment. At the expiration of that time, the incremental motion mechanism 56 is activated to rotate the basket through 90° after which rotation will stop for a second timed period. During this second timed period a second chamber will be in position to be filled as before, and the material in the chamber first above mentioned will be draining and will also be being de-aerated. The vacuum connection 74 is connected to a suitable vacuum source as before explained. Consequently, pressure within the chamber is below atmospheric.

It is important to note that water in the discharge line 19 will stand nearly at the upper end 19-B of the barometric leg, at a height according to the ambient barometric pressure and the vacuum within the chamber—and that vacuum of the vessel is thus maintained. A vacuum of about 27 or 28 inches of mercury is satisfactory, the cost of maintaining a vacuum in excess of 28 inches is, generally, not justified and, while results may be attainable with vacuums as low as 22 or 24 inches, disadvantages result as is well known in the art. When the second segment is loaded as required, this will occur at the expiration of the second timed interval, the third segment after rotation is in a filling position. So with the fourth segment. When the fourth segment is in a position to be filled, the first segment is in register with the opening 49, FIGURE 6, of the bottom of the chamber, thus the apple slices are discharged through the product-out chute 55 as before explained—or, in the case of the FIGURE 1-A alternative, through the product-out chute 55.1 flushing of which is aided by discharge from the bypass 84. Four incremental rotations through 90° complete one revolution of the basket, placing the first segment again in the position first described when the entire cycle is repeated. The time for a complete rotation is designed to accomplish the de-aeration required, i.e. until air within pores of the slices approach the vacuum pressure.

It is seen that apple slices from the slicer entering the feed sluice 11, FIGURE 1, are fed continuously into the de-aeration vessel 11. When a particular segment is in the loading position, drainage and de-aeration occur. In the second and third positions the apple slices are mainly under de-aeration. At the discharge position, de-aeration is completed. With the material parameters some of which have been described above nicely adjusted, discharge through the discharge line 19 is continuous, but will of course vary in intensity, as measured by the volume of fluid and number of slices discharged per unit of time.

From the whole of the foregoing explanations it is seen that the method employed includes: continuous feeding of product slices, in an admixture with water, to an evacuated chamber; drainage of the water from the admixture whilst the slices are in the evacuating vessel; holding the slices in the evacuated vessel for a length of time sufficient to cause a required degree of de-aeration, that is, until air within pores of the slices is substantially at the pressure within the vessel; discharging the de-aerated slices and water to a tank whilst maintaining the vacuum; and finally in removing the slices from the tank. This completes a cycle of operations according to the method disclosed herein, slicing and blanching methods being outside of the invention.

The open impeller pump 15 is of a known type obtainable from ordinary trade sources, a suitable capacity is 150 U.S. gallons of water per minute, which would contain some 166 pounds of apple slices. The size and number of the basket segments, the interval between successive increments of 90° motion, and like factors are matters of design. It is clear that introduction of the apple slices and water to the evacuated vessel could be accomplished by gravity, the particular means used for the introduction is not of prime importance to the central concept of the invention—any suitable means may be used.

The fluid operated cylinder mechanism as described is simple and satisfactory. As will be well-known to those skilled in the art, certain advantages of a mechanical nature will result from duplicating the mechanism illustrated so that the four-lobed ratchet, 65 FIGURE 8 is rotated by an external couple so as to reduce bearing load. Either pneumatic or hydraulic fluid operating means may effectively be utilized. An incremental motion as required may be obtained by other well known means, for instance a gear motor controlled by a suitable timer can be used. Any practical mechanical or electro-mechanical means may be used.

Having reference now to FIGURE 3, it is well known to those skilled in the art that there are many practical alternative possibilities of operatively interconnecting the limit switch, the timer, the electrical power source, and the solenoid actuated valve. The particular means illustrated, and the interconnection between them, does not form a part of my invention.

In FIGURE 1, the discharge line 19 is shown as being vertical, it may be at an angle to the vertical. Vertical configuration is preferred as resulting in the shortest length of line. If the water level 20-A of the conveyor tank is not maintained above an outlet end 19-C of the discharge, line 19, water should not, in spite of the vacuum, be expected to stand in a (typically) six inch discharge line. The level is maintained at 20-A by providing that an upper end 21-A of the down pipe 21 is at the required water level 20-A. Obvious water supply line means 11-A are required to maintain the water level 12 of the feed sluice 11. As a practical measure, the drain 13 is small for reasons well known in the art.

I claim:

1. A method of continuous de-aerating of a sliced food product including the steps of:

first, continuously introducing an admixture of the slices and water to a de-aerating vessel maintained under partial vacuum during all of the steps following;

second, draining the water from the slices whilst they are in the vessel;

third, maintaining the drained slices in the evacuating vessel until air within the pores of the slices has reduced in pressure to approach that within the evacuating vessel;

fourth, continuously discharging the slices from the vessel through a column of water of a discharge line of the vessel, the column of water being held, by atmospheric pressure, at a height within the line according to the partial vacuum aforesaid.

2. A method as defined in claim 1; wherein the slices are discharged from the vessel in an admixture with water.

3. A method as described in claim 2; the partial vacuum within the vessel being within the approximate limits of 27 to 28 inches of mercury.

4. Apparatus for continuous de-aerating of sliced products, including structure as follows:

(a) a vessel and means continuously to introduce an admixture of slices and water to said vessel, (b) means for continuously maintaining the vessel under a partial vacuum for de-aerating, (c) a hollow generally cylindrical open ended perforated basket mounted for rotation within the vessel, the basket having a number of segments, the introduction means being constructed and arranged to introduce the sliced product to a segment of the basket, (d) after a determinant interval of time, means for incremental rotation of the basket within the container through an angle such that an adjacent segment of the basket is placed in a filling position, means to discharge the sliced product from the segment first above mentioned and having been rotated to a position wherein the discharge of sliced product is entirely opposite the adjacent segment, (i) the rotating means including means for periodic repetition of the incremental motion at determinate intervals as above, (e) the bottom of the vessel having an opening forming a product-out discharge chute, so that when a segment has passed through incremental angular rotations aforesaid, the segment permits discharge of the contents from the discharge means thereof through the chute, (f) the discharge chute being at an upper end of a discharge pipe which pipe has a barometric leg such that, a lower end of the pipe being below the water level of a tank, the discharge pipe contains water nearly to an upper end of the barometric leg, being maintained at that position by pressure of the atmosphere upon the surface of the water in the tank, thus maintaining the partial vacuum aforesaid during discharge.

5. Apparatus having structure defined in claim 4; the tank having conveyor means to receive the slices and convey them out of the water of the tank.

6. Apparatus having structure defined in claim 5; wherein the incremental movement means includes a fluid actuating cylinder having a piston rod extensible and retractable of an end of the cylinder; pawl means interconnected with the piston rod to rotate a ratchet having a number of spaced lobes according to the number of segments of the basket, constructed and arranged so that motion of the piston rod shall rotate the ratchet, and the basket, through a required angular increment above, faces of the lobes being angularly spaced by the said angular increment; a fixed limit switch actuated, when the said rod is at an outer limit, by an element secured to the piston rod; the fluid actuating piston having a fluid line supplying fluid under pressure thereto; a solenoid valve in the line; the solenoid valve, the limit switch, a timing device, and a source of electrical energy, being electrically interconnected, the interconnected elements being constructed and arranged to supply fluid under pressure to the cylinder to accomplish periodic incremental motions as aforesaid.

7. Apparatus having structure as defined in claim 6; a feed sluice containing slices of the product and water; the feed sluice having a discharge opening to an open impeller pump, an outlet of which is connected to a product-in port of an upper wall of the de-aerating vessel by feed line.

8. Apparatus having structure as defined in claim 7, the basket having an inert flexible apron secured adjacent a lower edge of a sidewall of the basket, the apron extending completely around the sidewall and having a lower portion in contact with the bottom of the vessel.

9. Apparatus having structure as defined in claim 8, wherein a dewatering device is provided between an end of the feed pipe and the product-in port, the dewatering device having a longitudinal grate extending to a dam baffle, the grate being adapted to pass slices to the product-in port whilst a material amount of the water of the feed pipe passes through the grate and is deflected by the dam baffle to a by-pass line communicating with an upper end of the product-out chute.

References Cited

UNITED STATES PATENTS

| | | | |
|---|---|---|---|
| 2,507,797 | 5/1950 | Martin | 55—52 |
| 2,571,219 | 10/1951 | De Cew | 55—52 |
| 3,293,046 | 12/1966 | Werther | 99—154 |

REUBEN FRIEDMAN, *Primary Examiner.*

C. N. HART, *Assistant Examiner.*